US007676680B2

(12) United States Patent
Seelos et al.

(10) Patent No.: US 7,676,680 B2
(45) Date of Patent: Mar. 9, 2010

(54) SYSTEMS AND METHODS FOR DISTRIBUTING PRIVATE PLACEMENT DOCUMENTS

(75) Inventors: Robert Ross Seelos, New York, NY (US); David J. Brastauskas, New York, NY (US); Jenny Mak, Piscataway, NJ (US)

(73) Assignee: Morgan Stanley, New York, NY (US)

( * ) Notice: Subject to any disclaimer, the term of this patent is extended or adjusted under 35 U.S.C. 154(b) by 1228 days.

(21) Appl. No.: 11/177,898

(22) Filed: Jul. 8, 2005

(65) Prior Publication Data
US 2007/0011067 A1 Jan. 11, 2007

(51) Int. Cl.
*H04L 9/32* (2006.01)
(52) U.S. Cl. .................................................. 713/179
(58) Field of Classification Search ................. 713/179; 705/67
See application file for complete search history.

(56) References Cited

U.S. PATENT DOCUMENTS

| 7,325,253 | B2 * | 1/2008 | Colleran et al. ............... 726/27 |
| 2001/0034679 | A1 | 10/2001 | Wrigley |
| 2001/0034680 | A1 | 10/2001 | Purcell |
| 2002/0107770 | A1 * | 8/2002 | Meyer et al. .................. 705/36 |
| 2002/0108050 | A1 * | 8/2002 | Raley et al. .................. 713/193 |
| 2003/0088517 | A1 | 5/2003 | Medoff |
| 2003/0120578 | A1 | 6/2003 | Newman |
| 2003/0182234 | A1 | 9/2003 | Degroot |
| 2005/0108124 | A1 | 5/2005 | Colleran et al. |
| 2005/0223414 | A1 * | 10/2005 | Kenrich et al. ................ 726/27 |
| 2006/0111958 | A1 * | 5/2006 | Ishimaru et al. ............... 705/10 |

OTHER PUBLICATIONS

Appligent, "FDF Merge Datasheet," printed from http://www.appligent.com/products/fdf_merge/DS_FDFMerge.pdf on Jul. 8, 2005.
Regulation D Resources, "Offering Documentation and SEC Filings," printed from http://www.regdresources.com/services_mn2_sec_sub.cfm on Jul. 8, 2005.
Bison, Michael H., Marketing Securities in Cyberspace Preserving the Private Placement Exemption, 1999, pp. 1-3, Testa, Hurwitz & Thibeault; http://www.tht.com.
Electronic Prospectus Services, ADP Investor Communication Services, Dec. 15, 2004, pp. 1-2, http://ics.adp.com.
DownloadProspectus.com™ Revolutionizes Bond Prospectus Delivery with Online Service, Jun. 2, 2002, DPC Data Inc., http://www.dpcdata.com.
Boros, Elizabeth, Multimedia Prospectuses and Other Offer Documents, Dec. 1999, Australian Securites & Investments Commission/Center for Corporate Law & Securities Regulation, http://www.asic.gov or http://cclsr.law.unimelb.edu.

* cited by examiner

*Primary Examiner*—Kimyen Vu
*Assistant Examiner*—Suman Debnath
(74) *Attorney, Agent, or Firm*—K&L Gates LLP

(57) ABSTRACT

Methods of providing a private placement document to a potential investor in a private placement. The methods may comprise the step of generating the private placement document in an encrypted electronic format. The private placement document may include a unique identifier. The methods may also comprise the steps of providing the private placement document to the potential investor, and recording the unique identifier.

19 Claims, 4 Drawing Sheets

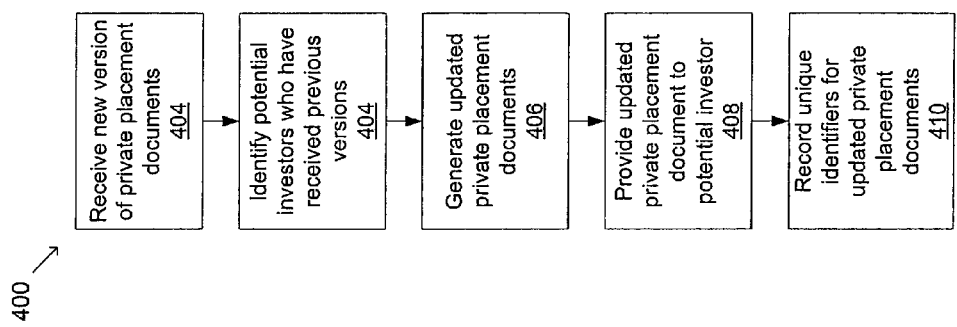

SYSTEMS AND METHODS FOR DISTRIBUTING PRIVATE PLACEMENT DOCUMENTS

BACKGROUND

Most security regulation schemes require a security issuer to complete a complicated and often extremely expensive registration and disclosure process before offering securities to the public. In many jurisdictions, however, an issuer may take advantage of less stringent registration and disclosure requirements by offering securities only to a limited and/or select group of investors, for example, investors with a high net worth and/or a high level of financial sophistication. An offering targeting limited and/or select groups of investors is often referred to as a private placement.

Although an issuer conducting a private placement is excused from certain registration and disclosure requirements, other complications arise. For example, in the United States and many other jurisdictions, the issuer must distribute and process subscription documents to and from an investor and determine that the investor is a member of the limited and/or select group before allowing the investor to subscribe to the private placement. It can be appreciated that the cost of sending, receiving, and processing paper subscription documents may be substantial. In addition, regulations require the issuer to carefully track each copy of a prospectus or other document sent to an investor. Tracking paper copies of prospectuses creates additional overhead expense.

SUMMARY

In one embodiment, the present invention is directed to computer assisted methods of providing a private placement document to a potential investor in a private placement. The methods may comprise the step of generating the private placement document in an encrypted electronic format. The private placement document may include a unique identifier. The methods may also comprise the steps of providing the private placement document to the potential investor, and recording the unique identifier.

In another embodiment, the present invention is directed to computer assisted methods of subscribing a potential investor to a private placement. The methods may comprise the steps of providing a subscription document to the potential investor in an encrypted electronic format. The subscription document may prompt the potential investor to enter information relating to the potential investor into the subscription document. The methods may also comprise the steps of receiving the subscription document from the potential investor in electronic format, and verifying that the subscription document contains requested information relating to the potential investor.

BRIEF DESCRIPTION OF THE DRAWINGS

Further advantages of the present invention may be better understood by referring to the following description taken in conjunction with the accompanying drawings, in which:

FIG. 4 is a diagram illustrating a process flow according to various embodiments of the present invention.

DESCRIPTION

As used herein, the term "private placement" refers to an offering of a security or securities that is made only to investors in a limited and/or select group. The limited and/or select group of investors may be defined according to the regulatory framework in the jurisdiction at issue.

As used herein, the term "security" has the definition set forth in Section 2(a)(1) of the Securities Act of 1933.

Figure 1:
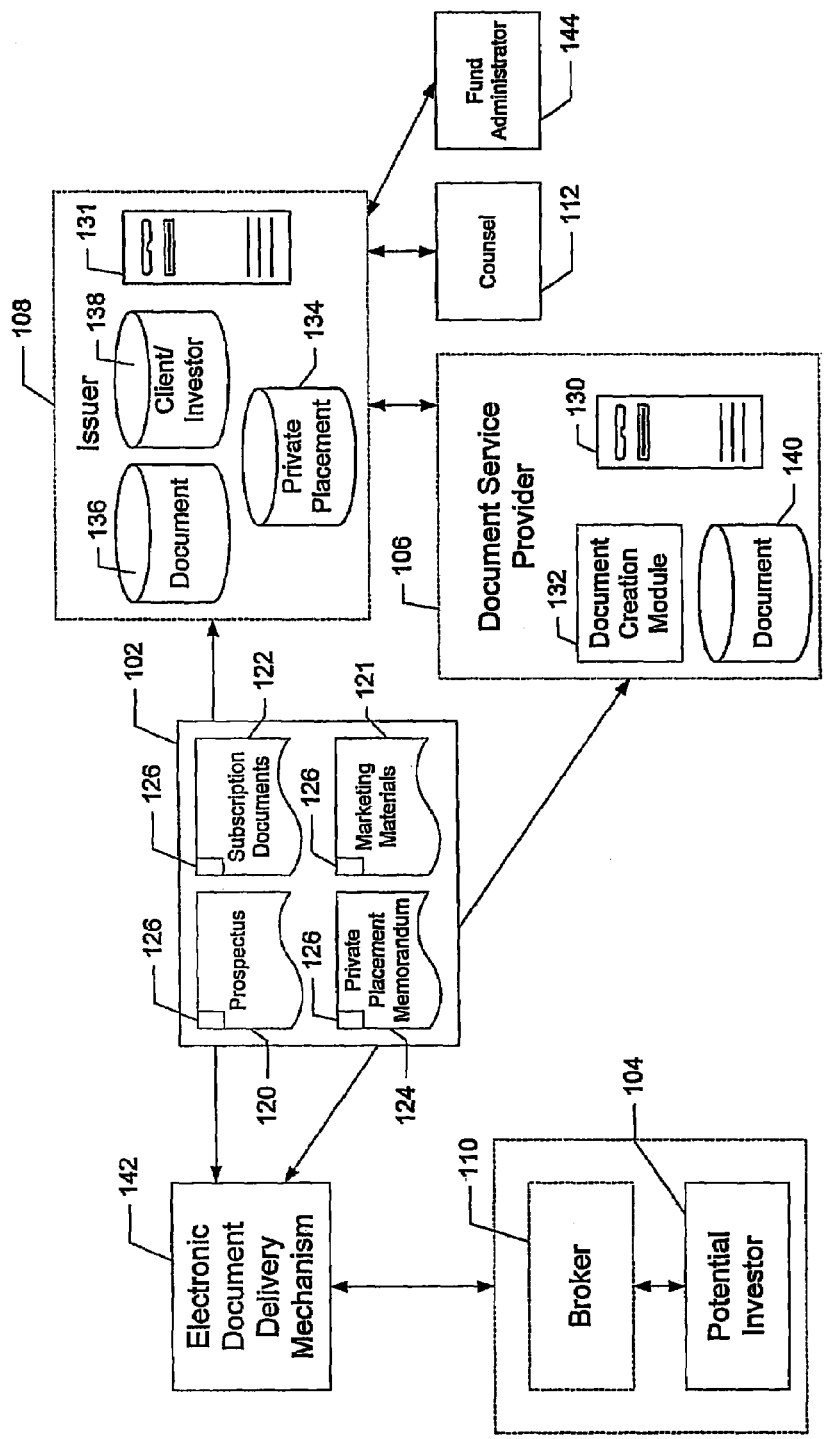
FIG. 1 is a diagram illustrating a system according to various embodiments of the present invention.
Figure 2:
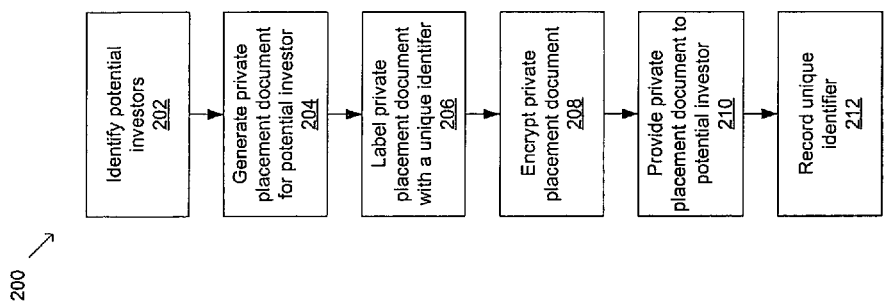
FIG. 2 is a diagram illustrating a process flow according to various embodiments of the present invention.

Referring now to FIGS. 1 and 2, embodiments of the present invention are provided. FIG. 1 shows various components and/or parties including, for example, a potential investor 104, a document service provider 106, and an issuer 108. It will be appreciated that various other components and parties may be utilized including, for example, a broker 110, external legal counsel 112, a fund administrator 144, etc. In various embodiments, the document service provider 106 may facilitate the creation, distribution and processing of private placement documents 102 between the potential investor 104, and the issuer 108 in connection with a private placement. It will be appreciated that in various embodiments, the potential investor 104 may act through a broker 110.

Private placement documents 102 may include any documents distributed to or received from the potential investor 104 in connection with the private placement. For example, private placement documents 102 may include one or more prospectuses 120, one or more private placement memorandums 124, one or more marketing brochures 121, and/or one or more subscription documents 122. It will be appreciated that not every set of private placement documents 102 will include each of documents 120, 121, 122 and 124.

The issuer 108 may be any entity or individual entitled to issue the securities. In one non-limiting example, the issuer 108 may be a limited partnership or other entity operating a hedge fund. The securities underlying the private placement may be interests in the limited partnership, giving holders of the interests a stake in the hedge fund. In various non-limiting embodiments, the issuer 108 may be a Subchapter C corporation, a Subchapter S corporation, a limited liability company, a limited liability partnership, or any other kind of entity or individual. The issuer 108 may be involved in any kind of investment and/or business activity. It will be appreciated that the securities underlying the private placement may be any kind of securities including, for example, equity interests in the issuer 108, debt instruments, etc.

The document service provider 106 may be any entity possessing the appropriate capabilities to produce, process and/or track private placement documents 102 on behalf of the issuer 108. In certain non-limiting embodiments, the document service provider 106 and the issuer 108 may be affiliated with one another. For example, the document service provider 106 may be a parent, subsidiary or sibling entity of the issuer 108. In other non-limiting embodiments, the issuer 108 and the document service provider 106 may be the same entity. For example, the issuer 108 may have the capabilities necessary to perform the tasks of the document service provider 106. In yet other non-limiting embodiments, the document service provider 106 may be a fiduciary of the issuer 108, for example, a prime brokerage firm, etc. It will be appreciated that the document service provider 106 may also serve the purpose of the fund administrator 144. In still other non-limiting embodiments, the document service provider 106 may be any commercial document center such as, for example, FEDEX KINKO'S, AMERICAN SPEEDY PRINTING CENTERS, etc.

In various embodiments, the document service provider 106 may utilize a computer system 130 to complete all or a portion of the methods described herein. Also, in various embodiments, the issuer 108 may utilize a computer system 131. The computer systems 130, 131 may include one or more modules including, for example, a document creation module 132. The modules may be implemented as software code, for example to be executed by a processor(s) of the computer system 130 using any type of computer instruction type, such as, for example, Java, C, C++, Visual Basic, etc., using, for example, conventional or object-oriented techniques. The software code may be stored as a series of instructions or commands on a computer readable medium, such as a random access memory (RAM); a read only memory (ROM); a magnetic medium, such as a hard drive or floppy disk; an optical medium such as a CD or DVD-ROM or a flash memory card, etc. The computer system 130 may also utilize one or more databases, such as databases 134, 136, 138, 140.

According to the process flow 200 shown in FIG. 2, at step 202, one or more potential investors 104 may be identified. In one non-limiting embodiment, the issuer 108 may identify the potential investor 104 by searching a client/investor database 138. The client/investor database 138 may include one or more lists of investors known to the issuer 108. Each investor may have an entry in the database 138 including, for example, information about the investor and the investor's relationship with the issuer 108.

The issuer 108 may scan each investor's entry in the client/investor database 138, for example, utilizing computer system 131, to identify a potential investor 104. The potential investor 104 may be, for example, an investor that the issuer 108 reasonably believes is a member of the limited and/or select group of investors who may subscribe to the private placement under the regulatory scheme of the relevant jurisdiction. It will be appreciated that potential investor 104 may be an individual investor or any kind of institutional investor and/or business entity. It will also be appreciated that the issuer 108 may identify other potential investors in addition to potential investor 104. In certain non-limiting embodiments, a potential investor 104 may approach the document service provider 106 and/or the issuer 108, identify itself as a potential investor 104 and request information regarding the private placement. When the issuer 108 identifies one or more potential investors 104, then the list of potential investors may be transferred to the document service provider 106 by any suitable communication method.

At step 204, the document service provider 106 may generate one or more private placement documents 102, for example, to provide to the potential investor 104 via the issuer 108 or through an entity recognized by the relevant jurisdiction to be permitted to distribute private placement documents 102 on behalf of the issuer 108. The private placement documents 102 may include any documents related to the private placement. For example, private placement documents 102 may include prospectuses 120, marketing materials 121, and/or private placement memorandums 124 setting forth information about the issuer 108 and the terms of the private placement 134. Private placement documents 102 may also include subscription documents 122 to be completed and returned by the potential investor 104, as described in more detail below. In a non-limiting embodiment, the document service provider 106 may provide printed or electronic documents for direct distribution to potential investors.

In generating the one or more private placement documents 102, the document service provider 106 may utilize the document creation module 132 of the computer system 130. The private placement documents 102 may be generated in any electronic format including, for example ADOBE PORTABLE DOCUMENT FORMAT (PDF), HyperText Markup Language (HTML), text format (TXT), Rich Text Format (RTF), MICROSOFT WORD format, Tagged Image File Format (TIFF), Joint Photographic Experts Group file format (JPEG), any standard bit-mapped graphics format (BMP), etc.

In various embodiments, the private placement documents 102 may be tailored to the particular potential investor 104 and/or the private placement. For example, the private placement documents 102 may be tailored to meet requirements of the potential investor's 104 jurisdiction. Different nations, and even different states within the United States, may require that different information be included in private placement documents 102. The private placement documents 102 may also be tailored based on attributes of the potential investor 104. For example, securities regulations of the relevant jurisdiction and/or policies of the issuer 108 may require differences in the private placement documents 102 based on whether the potential investor is an individual, an institutional investor, etc. Private placement documents 102 may also be customized based on the type of security underlying the private placement. The data necessary to create private placement documents 102 and customize the documents 102 may be stored at document database 136 of the issuer's 108 computer system 131 and/or database 140 of the document service provider's 106 computer system 130. In various embodiments, the data necessary to create and customize private placement documents 102 may be transferred from the issuer 108 to the document service provider 106 by any suitable data transfer method, for example, a secure data transfer method.

In certain non-limiting embodiments, the private placement documents 102 may be created according a merge method. For example, under the PDF document format, a Forms Data Format (FDF) may be created. The FDF may be a medium by which data is merged into, or extracted from, a PDF document. The FDF may be generated containing raw data to be included in the private placement documents 102. The raw data may include the name of the private placement and or potential investor 105, data necessary to customize the documents 102 and/or a unique identifier 126, as discussed below. The FDF may be "merged" into the final PDF document according to any method known in the art. For example, the FDF may be merged into the PDF document using the FDFMERGE software package from APPLIGENT.

At step 206, the private placement documents 102 may be labeled with a unique identifier 126. The unique identifier 126 may be any mark on the private placement documents 102 that identifies the documents 102. For example, the unique identifier 126 may be a number or letter identifying the particular copy of private placement documents 102. Different kinds of documents 120, 121, 122, 124, may have different kinds of unique identifiers 126, although generally the document identifiers may be consistent throughout the document package. The unique identifier 126 may be included on each page of the private placement documents 102, for example, to allow the private placement documents 102 to be identified. It will be appreciated that the documents 102 may be labeled with a unique identifier 126 during the documents' 102 creation, or as part of the same process. For example, unique identifiers 126 may be included in an FDF as discussed above and affixed to the final private placement documents 102 when the FDF is merged into a PDF document.

In various embodiments, the unique identifier 126 may include a header block stating, for example, a name of the potential investor 104, a company affiliation of the potential investor 104, the offering number, the date that the private placement documents 102 were distributed, a version number of the private placement documents 102, etc. In certain non-limiting embodiments, the unique identifiers 126 may be assigned to particular sets of private placement documents 102 sequentially with successive private placement documents 102 provided to successive investors receiving higher unique identifiers 126, for example unique identifiers 126 that are higher numerically or alphabetically. The unique identifier 126 may be incorporated into the private placement documents 102 in a manner that minimizes the risk of tampering, for example, as discussed below.

At step 208, the document service provider 106 may encrypt the private placement documents 102 to provide further protection from tampering or altering. Private placement documents 102 may be encrypted according to any suitable encryption method. For example, when the private placement documents 102 are included in a PDF format file, the documents 102 may be encrypted according to common 40 or 128 bit encryption methods for the PDF file format provided by products from various sources including, for example, ADOBE ACROBAT, NITROPDF DESKTOP, etc. In various embodiments, encryption may prevent unauthorized parties from editing or otherwise tampering with the documents 102. In various other embodiments, the private placement documents 102 may be further encrypted causing the documents 102 to be unreadable except by one who has a password.

In one non-limiting embodiment, the document service provider 106 may also configure the private placement documents 102 to expire or become unusable after a predetermined action and/or date. Securities regulation schemes in many jurisdictions require a potential investor 104 to return all private placement documents 102 to the issuer 108 if the potential investor 104 chooses not to subscribe to the private placement. Regulatory considerations aside, it can be appreciated that the issuer 108 may not want to have copies of private placement documents 102 in existence after the private placement. Accordingly, the private placement documents 102 may be configured to render themselves unusable after a certain predetermined date, for example, the date that the private placement ends. This may be accomplished by any suitable method including, for example, code embedded within the private placement documents 102, digital certificates, other methods utilizing various forms of digital rights management "DRM", etc. Making the private placement documents 102 unusable may include intentionally corrupting the documents 102 or otherwise preventing them from being viewed.

In various embodiments, the private placement documents 102 may be configured to become unusable upon the occurrence of a certain action. For example, the private placement documents 102 may include subscription documents 122 where the potential investor 104 is required to enter certain information. In various non-limiting embodiments, the private placement documents 102 may become unusable if the potential investor 104 indicates that it will not fill out the subscription documents 122, or does not fill out the subscription documents 122 within a predetermined time. Also, documents 102 may be configured to become unstable if after filling out the documents 102, it is determined that the potential investor 104 does not qualify for the terms of the private placement as determined by responses to investor qualification-type questions, At step 210, the private placement documents 102 may be provided to the potential investor 104. The private placement documents may be provided to the potential investor 104 from the document service provider 104 on behalf of the issuer 108, or may be provided directly by the issuer 108. In various embodiments, the documents 102 may be provided according to any suitable electronic document delivery mechanism 142. Non-limiting examples of electronic document delivery mechanisms 142 that may be used include, e-mail, File Transfer Protocol (FTP), encrypted email, any other electronic distribution mechanism utilizing a "push" technology, or a web portal where potential investor can "pull" or download the data from a secure information portal-type technology. In various embodiments, the electronic document delivery mechanism 142 may utilize secure hypertext transfer protocol (https) or any other web service designed to perform such activity where the request could be made through a protocol such as Simple Object Access Protocol ("SOAP").

In various embodiments, the issuer 108 may restrict the private placement documents 102 provided to potential investors, such as potential investor 104, according to the parameters of the private placement. For example, in some jurisdictions, the issuer 108 is permitted to provide private placement documents 102 only to a limited number of potential investors. It will be appreciated that it may be advantageous to provide private placement documents 102 to the potential investors with the most capital to invest. Therefore, the document service provider 106 or issuer 108 may not distribute private placement documents to the potential investor 104 unless the potential investor 104 meets certain criteria indicative of the amount of money the potential investor 104 has to invest, or the investor's 104 sophistication level.

In certain non-limiting embodiments, restrictions may be placed on the provision of private placement documents 102 only after a certain number of a total allotment have been distributed. For example, if a jurisdiction A allows only twelve copies of private placement documents 102 to be distributed, then restrictions may be placed on further distribution after a predetermined number of documents 102, such as six, have been distributed. Further distributions may require approval by the issuer 108. The document service provider 106 may be able to monitor the number of private placement documents 102 distributed by requesting a report, for example, from computer system 130 and passing this information to the issuer 108 for final decisions regarding the issuance of private placement documents At step 212, the document service provider 106 may record the unique identifier 126 of the private placement documents 102 at one or more central locations. In certain non-limiting embodiments, the unique identifier 126 for each set of private placement documents 102 distributed to a potential investor 104 may be recorded at the client/investor database 138, for example, at the entry in that database 138 for the particular potential investor 104. In other non-limiting embodiments, the unique identifier 126 may be recorded in a private placement database 134, which may contain a list of the unique identifiers 126 of all sets of private placement documents 102 sent in relation to the private placement. In non-limiting embodiments where the issuer 108 and the document service provider 106 are not the same party, information describing the unique identifier 126 for each set of private placement documents may be transferred from the computer system 130 of the document service provider 106 to computer system 131 of the issuer 108 for inclusion in the client/investor database 138 and/or database 134. The data may be transferred by any suitable data transfer means including, for example, a data feed from the document service provider 106.

Figure 3:
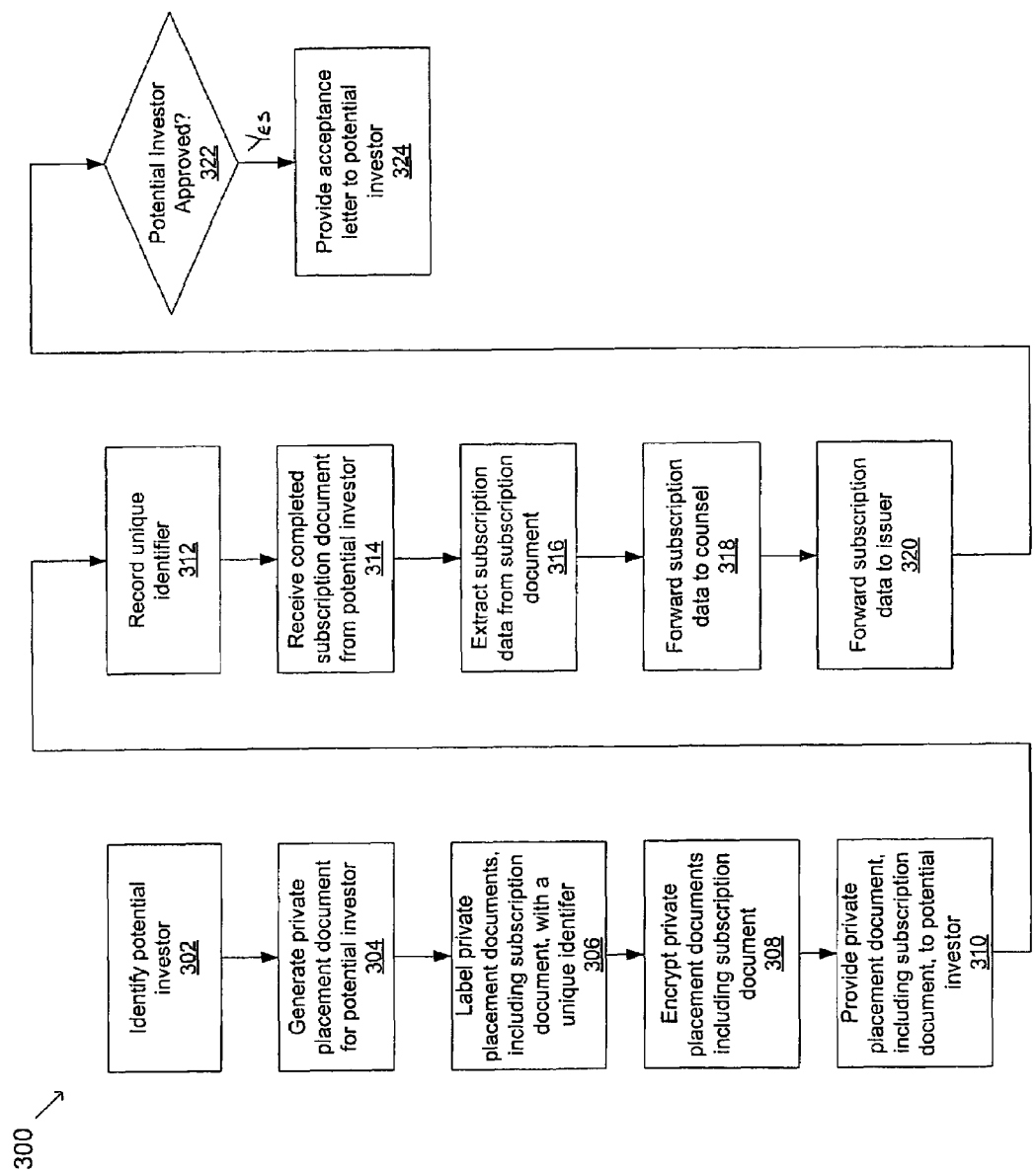
FIG. 3 is a diagram illustrating a process flow according to various embodiments of the present invention.

FIG. 3 shows a process flow 300 for distributing private placement documents 102 to a potential investor 104 including subscription documents 122, and for processing the subscription documents 122 according to various embodiments of the present invention. At step 302, the issuer 108 may identify the potential investor 104, for example, as described above with reference to step 202 of process flow 200.

At step 304, the document service provider 106 may generate a set of private placement documents 102. The private placement documents 102 may be generated according to any suitable electronic document format, as described above with reference to step 204 of process flow 200. The set of private placement documents 102 may include subscription documents 122. The subscription documents 122 may prompt the potential investor 104 to enter subscription data, for example, by written instructions, or in certain non-limiting embodiments, by causing instructions to pop-up on a screen of a computer system of the potential investor 104. Subscription data may include information establishing whether the potential investor 104 is a member of the limited and/or select group of investors qualified to subscribe to the private placement. In various embodiments, the subscription documents 122 may include one or more investor qualification worksheets (not shown). Subscription data may be collected through responses to the investor qualification worksheets. In certain non-limiting embodiments, the subscription data may include the potential investor's 104 name, address, net worth, etc.

At step 306, the document service provider 106 may label the private placement documents 102, including the subscription documents, with a unique identifier 126. In various non-limiting embodiments, the unique identifier 126 may be affixed to the private placement documents 102 in a way similar to that described with reference to step 206 of process flow 200 described above.

The document service provider 106 may encrypt the private placement documents 102, including the subscription documents, at step 308. In various embodiments, private placement documents 102 other than the subscription documents may be encrypted as described above with reference to step 208. In certain non-limiting embodiments, subscription documents 122 may be encrypted in a manner that allows the potential investors 102 to enter the subscription data into the subscription documents, but prevents the potential investors 102 from editing other information in the subscription documents including, for example, the unique identifier 126. In certain non-limiting embodiments, the subscription documents 122 may include one or more encrypted fields and one or more unencrypted fields. The unencrypted fields may allow the potential investor 104 to enter information about itself. The encrypted fields may include data prompting the potential investor 104 for subscription data and providing instructions for entering the data.

At steps 310 and 312, the document service provider 106 may provide the private placement documents 102, including subscription documents to the potential investor 104, and record the unique identifier 126 of the private placement documents 102, for example, as described above with reference to steps 210 and 212 of the process flow 200.

After the document service provider 106 forwards the private placement documents 102 including the subscription documents 122 to the potential investor 104, the potential investor 104 may complete the subscription documents 122 by entering subscription data. The potential investor 104 may enter subscription data into the subscription documents 122 electronically, for example, by filling in unencrypted fields using a computer (not shown). In various embodiments, the subscription documents 122 may alert the potential investor 104 of any mistakes made entering the subscription data and prompt the potential investor 104 to make corrections prior to the document data submission/transmission process (either electronic or hardcopy).

In various embodiments, the subscription document 122 may be validated using client-side technology such as, but not limited to JavaScript. This client-side validation may include validation of required fields, visual identification (highlighting) of missing fields. The client-side validation may also make an initial determination regarding the qualifications of the potential investor 104 to subscribe to the private placement. Once validated, the subscription document 122 data may be transmitted to the issuer 108 and/or document service provider 106 via the selected transfer mechanism, for example, electronic document delivery mechanism 142. When the subscription documents 122 are transmitted, they may be locked and password protected to prevent subsequent changes. If changes are required at the request of the reviewer, e.g., document service provider 106, issuer 108, legal counsel 112, and/or fund administrator 144, an unlock code may be provided be any suitable method including, for example, email or phone to enable the potential investor 104 to make additional changes and resubmit the documents 122 to the document service provider 106, issuer 108, or other entity acting on behalf of the issuer 108 to collect potential investor 104 data.

The issuer 108 and/or document service provider 106 may receive the private placement documents 102, including the completed subscription documents, from the potential investor 104 at step 314. The private placement documents may be received by any suitable document transmittal method including, for example, electronic document delivery mechanism 142. In certain non-limiting embodiments, the potential investor 104 may print the private placement documents and return a hard copy of the documents to the document service provider 106, for example, by post or facsimile.

At step 316, the document service provider 106 or similar data collection entity may extract subscription data from the subscription documents 122. In certain non-limiting embodiments where the subscription documents 122 are returned to the document service provider 106 in electronic format, this may involve extracting the data from and parsing the documents 122, for example, investor qualification worksheets, to read subscription data, or processing only the returned data through a protocol such as XML. In other non-limiting embodiments, where the subscription documents 122 are returned to the document service provider 106 in paper format, extracting subscription data may involve scanning the subscription documents 122 into an electronic format using a technology such as optical character recognition ("OCR") and then parsing the electronic format to read subscription data. Another non-limiting embodiment may include the use of a dynamic barcode include with the subscription document 122 that continuously changes to reflect all entered information within the subscription document 122, for example, using barcode methods available from ADOBE. In this embodiment, a single hardcopy page containing the barcode (delivered via facsimile, email, or post, etc) may provide all data in a protocol such as XML, retrievable through the use of a handheld barcode scanner, for example. The document service provider 106 may verify that the subscription data is complete and in a correct format upon receipt using a document logic protocol.

At step 314 or 316, if the subscription data is not complete and/or not in the correct format, the subscription documents 122 may be returned to the potential investor 104 for correction. The return of this data to the potential investor 104 may accomplished according to several different methods, for example, to ensure that the data is transmitted and received securely. In one non-limiting embodiment, the subscription document 122 may be a PDF document having a password necessary to open the document 122. To ensure confidentiality, this password may be provided only over the phone to the potential investor 104 or contained within a follow-up e-mail or other communication, unrelated to the email or other communication containing the encrypted document. In another non-limiting embodiment, the subscription document 122 may be sent utilizing electronic document delivery mechanism 142. In yet another non-limiting embodiment, the potential investor 104 may be provided with an "unlock" password allowing the potential investor 104 to change and resubmit the subscription documents 126. Once submitted back to document service provider 106 for processing, the document may be once again locked against changes with a new password At step 318, the document service provider 106 or issuer 108 may forward or otherwise make the subscription document 122 and/or the underlying subscription data available to selected third party service providers including, for example, external legal counsel 112 and/or the fund administrator 144, for example, through a secure web portal. External legal counsel 112 may be retained by the document service provider 106 on behalf of the issuer and/or by the issuer 108 itself. For example, where the issuer 108 is an entity operating a hedge fund, the external counsel 112 may be counsel for the hedge fund. In various embodiments, external counsel 112 may review the subscription data and determine whether the potential investor 104 is legally entitled to subscribe to the private placement, for example, whether the potential investor 104 is a member of the limited and/or select group of investors.

At step 320, the document service provider 106 may forward the subscription data to the issuer 108. For example, the document service provider 106 may forward the subscription data to the management of the issuer 108. In various embodiments, the management of the issuer 108 may include one or more general partners, a board of directors, a chief executive officer, etc. The issuer 108, for example, through its management, may determine whether to accept a subscription from the potential investor 104 according to any legally allowable criteria.

If at step 322 counsel 112 determines that the potential investor 104 is qualified to subscribe to the private placement, and the issuer 108 determines that the potential investor 104 is acceptable, and then an acceptance letter may be sent to the potential investor 104 at step 324. In various embodiments, the fund administrator 144 may also pass on the investor before the acceptance letter is sent. The acceptance letter may be in an electronic format and may be encrypted in a manner similar to the private placement documents 102 described above. The acceptance letter may be forwarded to the potential investor 104 according to any suitable method including, for example, through electronic document delivery mechanism 142. In certain non-limiting embodiments, the acceptance letter may be sent to the potential investor in paper form, for example, by post or facsimile. It will be appreciated that the process flows 200 and/or 300 may be executed multiple times for multiple other potential investors (not shown), subject to jurisdictional securities regulations, and for example, until the private placement is fully subscribed.

FIG. 4 shows a process flow 400 for updating private placement documents 102 according to various embodiments of the present invention. At step 404, the document service provider 106 may receive a new version of private placement documents 102, for example, from the issuer 108. The new version may have been created for any reason. For example, the new version of the private placement documents 102 may reflect changes relating to the issuer 108, changes relating to a regulatory scheme for the jurisdiction at issue, etc. Changes to the private placement documents 102 may, in various embodiments, be stored in document database 136.

At step 404, the document service provider 106 and/or the issuer 108 may identify potential investors who have received previous versions of the private placement documents 102. For example, the document service provider 106 may have access to examine the client/investor database 138 to locate the entries of potential investors 102 who have received private placement documents 102 relating to the private placement. The version of the private placement documents 102 received by each potential investor 104 may be recorded in the potential investor's 104 entry in the client/investor database 138. In certain other non-limiting embodiments, the document service provider 106 or issuer 108 may examine the private placement database 134 and/or client/investor database 138. The private placement database 134 may include a list of all potential investors 104 who have received private placement documents 102 according to the private placement and the versions that each potential investor has received.

At step 406, the document service provider 106 may generate updated private placement documents 102 for potential investors 102 who have not received the most recent version of the private placement documents 102. The private placement documents 102 may be generated in an electronic format, marked with the previously issued identifier 126 and encrypted, for example, as discussed above with reference to process flows 200 and 300. The private placement documents 102 may also be customized based on attributes of the potential investor 104 including jurisdiction, size, etc. as discussed above. At steps 408 and 410, the document service provider 106 may provide updated private placement documents 102 to the potential investor 104 and record the unique identifiers 126 of the private placement documents 102, for example, as described herein.

It is to be understood that the figures and descriptions of the present invention have been simplified to illustrate elements that are relevant for a clear understanding of the present invention, while eliminating, for purposes of clarity, other elements, such as, for example, details of operating systems, computer hardware, etc. Those of ordinary skill in the art will recognize that these and other elements may be desirable. However, because such elements are well known in the art, and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A computer assisted method of providing a private placement document to a potential investor in a private placement, the method comprising:
   generating the private placement document in an encrypted electronic format with a computer system comprising at least one processor and operatively associated memory, wherein generating the private placement document includes labeling the private placement document with a unique identifier and wherein the private placement document comprises a subscription document;
   providing the private placement document to the potential investor electronically with the computer system, wherein the subscription document is programmed to:
   (i) prompt the potential investor to enter information relating to the potential investor into the subscription document;
   (ii) conditioned upon the potential investor declining to enter the information relating to the potential investor into the subscription document, rendering the private placement document unreadable by the potential investor;
   (iii) conditioned upon the information relating to the potential investor failing to meet a pre-determined qualification standard, rendering the private placement document unreadable by the potential investor; and
   (iv) conditioned upon the potential investor failing to enter the information relating to the potential investor into the subscription document within a predetermined amount of time, rendering the private placement document unreadable by the potential investor;
   recording the unique identifier at a database in communication with the computer system, wherein the unique identifier is recorded at the database in association with the potential investor;
   electronically receiving the subscription document from the potential investor with the computer system, wherein the subscription document, when received from the potential investor, comprises the information relating to the potential investor; and
   verifying with the computer system that the information relating to the potential investor is correctly entered into the subscription document.

2. The method of claim 1, wherein the private placement document further comprises at least one of a prospectus document, marketing materials, and a private placement memorandum.

3. The method of claim 1, wherein the generating includes incorporating into the private placement document information related to the location of the potential investor.

4. The method of claim 1, wherein the generating includes incorporating into the private placement document information related to a security to be offered in the private placement.

5. The method of claim 1, wherein the generating includes incorporating into the private placement document information related to the potential investor.

6. The method of claim 1, further comprising selecting the potential investor from a plurality of potential investors.

7. The method of claim 1, further comprising:
   generating a second private placement document in the encrypted electronic format, wherein the second private placement document includes a second unique identifier;
   providing the second private placement document to a second potential investor; and
   recording the second unique identifier in the log corresponding to the private placement.

8. The method of claim 1, wherein the private placement document is configured to become unusable after a predetermined amount of time.

9. The method of claim 1, wherein the electronic format is the ADOBE PORTABLE DOCUMENT FORMAT (PDF).

10. The method of claim 1, wherein the unique identifier is included on each page of the private placement document.

11. The method of claim 1, wherein the unique identifier includes at least one of a name of the potential investor, a company affiliation of the potential investor, an offering number, a date that the private placement documents were distributed, and a version number of the private placement documents.

12. The method of claim 1, wherein the providing includes providing according to at least one of e-mail, File Transfer Protocol (FTP), and internet portal delivery.

13. The method of claim 1, wherein the unique identifier includes a version number of the private placement document, the method further comprising:
   checking a version of the private placement document provided to the potential investor; and
   providing a newer version of the private placement document to the potential investor.

14. The method of claim 1, further comprising forwarding at least a portion of the requested information relating to the potential investor to at least one of counsel and a fund administrator for review.

15. The method of claim 1, further comprising forwarding at least a portion of the requested information relating to the potential investor to an issuer of the private placement for approval.

16. A computer readable medium having instructions thereon that when executed by a computer system causes the computer system to provide a private placement document to a potential investor in a private placement, the method comprising:
   generating the private placement document in an encrypted electronic format with a computer system comprising at least one processor and operatively associated memory, wherein generating the private placement document includes labeling the private placement document with a unique identifier and wherein the private placement document comprises a subscription document;
   providing the private placement document to the potential investor electronically with the computer system, wherein the subscription document is programmed to:
   (i) prompt the potential investor to enter information relating to the potential investor into the subscription document;
   (ii) conditioned upon the potential investor declining to enter the information relating to the potential investor into the subscription document, rendering the private placement document unreadable by the potential investor;
   (iii) conditioned upon the information relating to the potential investor failing to meet a pre-determined qualification standard, rendering the private placement document unreadable by the potential investor; and (iv) conditioned upon the potential investor failing to enter the information relating to the potential investor into the subscription document within a predetermined amount of time, rendering the private placement document unreadable by the potential investor;

electronically receiving the subscription document from the potential investor with the computer system, wherein the subscription document, when received from the potential investor, comprises the information relating to the potential investor; and verifying with the computer system that the information relating to the potential investor is correctly entered into the subscription document.

17. The method of claim 1, wherein the private placement document is programmed to become unusable conditioned upon the potential investor declining to enter the information relating to the potential investor into the subscription document.

18. The method of claim 1, wherein the private placement document is programmed to become unusable conditioned upon the potential investor failing to enter the information relating to the potential investor into the subscription document within a predetermined amount of time.

19. A computer-implemented system for providing a private placement document to a potential investor in a private placement, the system comprising a computer system, the computer system comprising at least one processor and an operatively associated memory comprising instructions thereon that, when executed by the at least one processor, causes the computer system to:

generate the private placement document in an encrypted electronic format, wherein generating the private placement document includes labeling the private placement document with a unique identifier and wherein the private placement document comprises a subscription document;

provide the private placement document to the potential investor electronically, wherein the subscription document is programmed to:

(i) prompt the potential investor to enter information relating to the potential investor into the subscription document;

(ii) conditioned upon the potential investor declining to enter the information relating to the potential investor into the subscription document, rendering the private placement document unreadable by the potential investor;

(iii) conditioned upon the information relating to the potential investor failing to meet a pre-determined qualification standard, rendering the private placement document unreadable by the potential investor; and (iv) conditioned upon the potential investor failing to enter the information relating to the potential investor into the subscription document within a predetermined amount of time, rendering the private placement document unreadable by the potential investor;

record the unique identifier at a database in communication with the computer system, wherein the unique identifier is recorded at the database in association with an indication of the potential investor;

electronically receive the subscription document from the potential investor, wherein the subscription document, when received from the potential investor, comprises the information relating to the potential investor; and verify that the information relating to the potential investor is correctly entered into the subscription document.

* * * * *